United States Patent
Gerbi et al.

(10) Patent No.: US 10,738,641 B2
(45) Date of Patent: Aug. 11, 2020

(54) DRY GAS SEAL

(71) Applicant: Nuovo Pignone Tecnologie Srl, Florence (IT)

(72) Inventors: Filippo Gerbi, Florence (IT); Emanuele Rizzo, Florence (IT); Andrea Bernocchi, Florence (IT); Marco Marrazzo, Florence (IT); Leonardo Baldassarre, Florence (IT); Amelia Lavinia Ricchiuti, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 157 days.

(21) Appl. No.: 15/922,247

(22) Filed: Mar. 15, 2018

(65) Prior Publication Data
US 2018/0266265 A1    Sep. 20, 2018

(30) Foreign Application Priority Data

Mar. 17, 2017   (IT) .......................... 102017000029982

(51) Int. Cl.
*F01D 11/06*    (2006.01)
*F01D 21/00*    (2006.01)
(Continued)

(52) U.S. Cl.
CPC ............ *F01D 11/06* (2013.01); *F01D 11/003* (2013.01); *F01D 21/003* (2013.01);
(Continued)

(58) Field of Classification Search
CPC ........ F01D 11/06; F01D 11/003; F01D 21/003; F01D 21/14; F01D 11/04; F16J 15/3492;
(Continued)

(56) References Cited

U.S. PATENT DOCUMENTS 4,094,512 A  *  6/1978  Back ...................... F16J 15/008
                                                    277/320
4,212,475 A  *  7/1980  Sedy .................... F16J 15/3412
                                                    277/400

(Continued)

FOREIGN PATENT DOCUMENTS

EP        3139072 A1    3/2017

OTHER PUBLICATIONS

Search Report and Opinion issued in connection with corresponding IT Application No. 102017000029982 dated Nov. 17, 2017 (English Translation not available).

(Continued)

*Primary Examiner* — J. Todd Newton
(74) *Attorney, Agent, or Firm* — Baker Hughes Patent Organization

(57) ABSTRACT

A dry gas seal for sealing the shaft of a turbomachinery, provided with means for the continuous health monitoring of the dry gas seal comprising one or more sensors adapted to measure strains and/or loads induced to the primary ring of the dry gas seal and/or strains induced to one or more of the elastic elements coupled to the primary ring and/or adapted to measure displacements of the primary ring or of an element coupled to the primary ring, for an early detection of failure of the seal, thus enabling main failures early detection capability and proactive maintenance actions.

14 Claims, 7 Drawing Sheets

(51) Int. Cl.
*F04D 29/12* (2006.01)
*F16J 15/34* (2006.01)
*F01D 11/00* (2006.01)
*F16J 15/26* (2006.01)
*F16J 15/40* (2006.01)
*F02C 7/28* (2006.01)
*F04D 29/10* (2006.01)

(52) U.S. Cl.
CPC ............ *F04D 29/124* (2013.01); *F16J 15/26* (2013.01); *F16J 15/3492* (2013.01); *F16J 15/40* (2013.01); *F02C 7/28* (2013.01); *F04D 29/104* (2013.01); *F05D 2240/55* (2013.01); *F05D 2260/80* (2013.01); *F05D 2270/305* (2013.01); *F05D 2270/331* (2013.01); *F05D 2270/334* (2013.01); *F05D 2270/808* (2013.01)

(58) Field of Classification Search
CPC .......... F16J 15/40; F16J 15/26; F04D 29/124; F04D 27/008; F04D 27/001; F05D 2270/808; F05D 2270/334; F05D 2270/331; F05D 2270/305; F05D 2240/55; F05D 2260/80
See application file for complete search history.

(56) References Cited

U.S. PATENT DOCUMENTS

| | | | | |
|---|---|---|---|---|
| 4,424,973 A * | 1/1984 | Heilala | ............... | F16J 15/3492 277/318 |
| 4,424,975 A * | 1/1984 | Langebrake | ......... | F16J 15/3444 277/306 |
| 4,447,063 A * | 5/1984 | Kotzur | .................. | F16J 15/342 277/304 |
| 4,497,493 A * | 2/1985 | Sall | ...................... | F16J 15/3404 277/306 |
| 4,509,762 A * | 4/1985 | Garrett | ............... | F16J 15/3464 277/372 |
| 5,246,235 A * | 9/1993 | Heinzen | ................... | F16J 15/16 116/208 |
| 5,330,720 A * | 7/1994 | Sorbo | .................. | G01M 3/183 277/320 |
| 5,448,924 A * | 9/1995 | Nagai | .................... | G01D 21/02 277/321 |
| 5,492,341 A * | 2/1996 | Pecht | .................. | F16J 15/3412 277/400 |
| 5,540,448 A * | 7/1996 | Heinzen | ................... | F16J 15/16 116/208 |
| 6,003,872 A * | 12/1999 | Nord | .................... | F16J 15/3296 277/317 |
| 6,345,954 B1 | 2/2002 | Al-Himyary et al. | | |
| 6,626,436 B2 * | 9/2003 | Pecht | .................. | F16J 15/3492 277/317 |
| 7,405,818 B2 * | 7/2008 | Heinzen | ............... | F16J 15/3492 116/208 |
| 8,264,347 B2 * | 9/2012 | Castleman | ............ | F16J 15/064 340/540 |
| 8,448,949 B2 * | 5/2013 | Stewart | .................. | F16J 15/064 277/317 |
| 8,527,214 B2 * | 9/2013 | Horak | .................... | G01N 29/14 702/189 |
| 9,541,199 B2 * | 1/2017 | Rust | ...................... | F16J 15/064 |
| 9,631,990 B2 * | 4/2017 | Sun | ............................ | G01L 3/02 |
| 9,951,872 B2 * | 4/2018 | Thorson | ............... | F16J 15/3404 |
| 2003/0015840 A1 * | 1/2003 | Davis | .................... | F16J 15/004 277/320 |
| 2003/0184018 A1 * | 10/2003 | Upton | ................... | F16J 15/004 277/318 |
| 2005/0016303 A1 * | 1/2005 | Jacobs | ................ | F16J 15/3492 73/865.9 |
| 2012/0112416 A1 * | 5/2012 | Berger | ................ | F16J 15/3492 277/358 |
| 2014/0030063 A1 | 1/2014 | Mateman | | |
| 2014/0161587 A1 * | 6/2014 | Shamseldin | ......... | F04D 29/124 415/1 |

OTHER PUBLICATIONS

Extended European Search Report and Opinion issued in connection with corresponding EP Application No. 18161806.7 dated Aug. 2, 2018.

* cited by examiner

DRY GAS SEAL

BACKGROUND OF THE INVENTION

Embodiments of the subject matter disclosed herein relate to dry gas seals to provide reliable shaft sealing on turbomachinery, particularly centrifugal compressors.

A compressor is a machine which accelerates the particles of a compressible fluid, e.g., a gas, through the use of mechanical energy to, ultimately, increase the pressure of that compressible fluid. Compressors are used in a number of different applications, including operating as an initial stage of a gas turbine engine. Among the various types of compressors are the so-called centrifugal compressors, in which the mechanical energy operates on gas input to the compressor by way of centrifugal acceleration which accelerates the gas particles, e.g., by rotating a centrifugal impeller through which the gas is passing. More generally, centrifugal compressors can be said to be part of a class of machinery known as "turbo machines" or "turbo rotating machines".

Centrifugal compressors can be fitted with a single impeller, i.e., a single stage configuration, or with a plurality of impellers in series, in which case they are frequently referred to as multistage compressors. Each of the stages of a centrifugal compressor typically includes an inlet conduit for gas to be accelerated, an impeller which is capable of providing kinetic energy to the input gas and a diffuser which converts the kinetic energy of the gas leaving the impeller into pressure energy. Various types of gases are used in centrifugal compressors, some of which are toxic or dangerous to the environment and/or to workers in the plants. Accordingly, centrifugal compressors employ sealing systems, usually placed on the ends of the shaft that supports the impeller(s), to prevent the gas from escaping from the compressor and contaminating the surrounding environment. Single rotor centrifugal compressors are usually provided with two separate seals as part of this sealing system, i.e., one for each end of the shaft, while in a overhung centrifugal compressor it is usually sufficient to seal the shaft end, located immediately downstream of the impeller.

Recently there has been an increase in the use of so-called "dry" gas seals in sealing systems for centrifugal compressors. Dry gas seals can be described as non-contacting, dry-running mechanical face seals which include a mating or rotating ring and a primary or stationary ring. In operation, grooves in the rotating ring generate a fluid-dynamic force causing the stationary ring to separate and create a gap between the two rings. These seals are referred to as "dry" since they do not require lubricating oil which, among other things, greatly reduces their maintenance requirements.

For centrifugal compressors, such dry gas seals are available in different configurations, e.g., so-called tandem configurations which are primarily used in compressors that employ toxic or flammable gases as the input or process gas. As shown in FIG. 1, a tandem-type dry gas seal system includes a first seal 2 and a second seal 4, both contained in a single package. During normal operation of the compressor, the first seal 2 operates to contain the total pressure of gas processed, while the second seal 4 acts as a back-up which is designed to operate only if the first seal 2 fails or leaks excessively. Generally a conditioned gas flow coming from compressor discharge is injected upstream of seal 2 to isolate the dry gas seal from process gas. In the applications with highly toxic process gases (e.g., gas having high contents of H2S) and high sealing pressure, an external sealing gas source having a low sulfur content, e.g., a so-called "sweet" gas is usually provided to isolate the process gas from the surroundings. Due to the high sealing pressure a dedicated reciprocating compressor 6 that operates independently of the centrifugal compressor is used to feed the sealing gas system. The second seal 4 in the tandem may receive a lower pressure (e.g., below 10 Bar) of nitrogen as secondary sealing gas via a source 8 to ensure that no toxic/flammable gas escapes to the surroundings. Centrifugal compressors equipped with these types of dry gas sealing systems thus also require additional compressors whose function is solely to provide the sealing gas, thus making the overall system more complex. In addition to simply adding complexity, reciprocating compressors 6 may have greater maintenance requirements than even the centrifugal compressors which they are intended to serve. Moreover, although the second seal 4 in the tandem configuration does provide a back-up capability, current dry gas seal systems are still not fault free, in which case they may undesirably release a certain amount of sealing gas into the atmosphere.

Dry gas seal failures are mainly due to liquid or solid particles contamination, "hang up" of primary disc causing discs contact, or axial vibration of primary disk ("swashing"). All of them causing severe malfunctioning of the seal.

Accordingly, it would be desirable to design and provide a dry gas seal which overcomes the aforementioned drawbacks of existing sealing systems.

BRIEF DESCRIPTION OF THE INVENTION

According to exemplary embodiments, there is a dry gas seal for sealing the shaft of a turbomachinery, the seal comprising:
  a mating ring configured to be coupled to the shaft of the turbomachinery to rotate at shaft rotational speed;
  a primary ring that seals against the mating ring, the primary ring configured to be anti-rotationally coupled to a static part of the turbomachinery;
  one or more elastic elements preloaded to push the primary ring against the mating ring,
wherein one or more sensors are provided, adapted to measure strains and/or loads induced to the primary ring and/or to one or more of the elastic elements and/or displacements of the primary ring or of an element coupled to the primary ring for an early detection of failure of the seal.

This allows the continuous health monitoring of the dry gas seal, enabling main failures early detection capability and proactive maintenance actions.

Early detection of seals incipient failures could lead to unexpected machine stop avoidance, thus increasing production and creating opportunity for commercial tools related to increased reliability and availability of the machines.

According to exemplary embodiments, there is a turbomachine, particularly a compressor, comprising:
  a rotor assembly including at least an impeller;
  a bearing connected to, and for rotatably supporting, the rotor assembly;
  a stator;
  a sealing mechanism disposed between the rotor assembly and the bearing, said sealing mechanism including a dry gas seal wherein the primary ring of the seal is coupled to a retainer through an anti-rotational system comprising one or more anti-rotational pin or lug and an intermediate element or carrier acting as a pusher sleeve to axially push the primary ring against the mating ring under the action of a preloaded elastic element. The sensor or sensors of the seal comprise one or more sensors belonging to the group consisting in: displacement sensors for the measurement of the axial displacement of the primary ring, displacement sensors for the measurement of the axial displacement of the intermediate ring, strain sensors for the measurement of the torque induced to the primary ring, load sensors for the measurement of static load acting on the carrier and/or the primary ring and/or vibrations of the carrier and/or the primary ring.

According to exemplary embodiments, there is a method for monitoring the status of a dry gas seal in a turbomachine, the method comprising the operations of:
  providing sensors adapted to measure strains and/or loads induced to the primary ring and/or displacements of the primary ring or of an element coupled to the primary ring of the dry gas seal;
  setting acceptance criteria for the values measured by the sensors;
  reading the output of the sensors;
  test the output with the acceptance criteria;
  activate an alarm and/or shut down the turbomachine if one or more values measured by the sensors do not follow the acceptance criteria.

According to exemplary embodiments, there is a system for the monitoring and early detection of fault of dry gas seals of remotely located turbomachines, the system comprising:
  a collecting unit for collecting data from sensors located on the dry seals of the turbomachines;
  communication units to interface the turbomachines to the collecting unit;
  a software platform configured to read data from the collecting unit to perform analytics to do early detection and/or send notifications of potential damages or to perform condition based maintenance of the turbomachines.

BRIEF DESCRIPTION OF THE DRAWINGS

The present invention will become more apparent from the following description of exemplary embodiments to be considered in conjunction with accompanying drawings wherein.

DETAILED DESCRIPTION OF THE INVENTION

The following description of exemplary embodiments refer to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
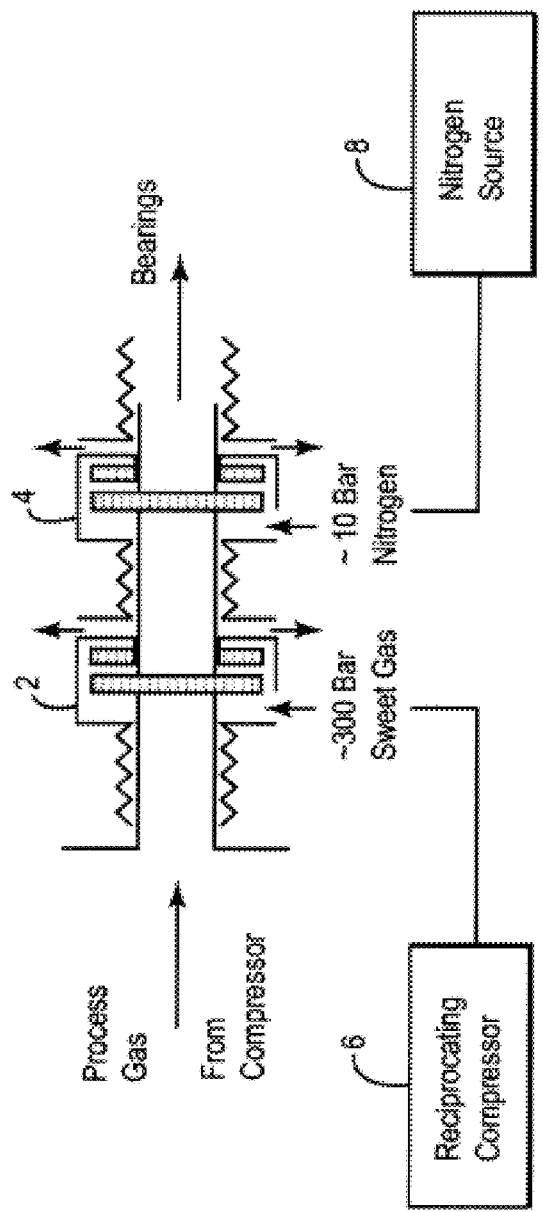
FIG. 1 illustrates a tandem sealing mechanism.
Figure 2:
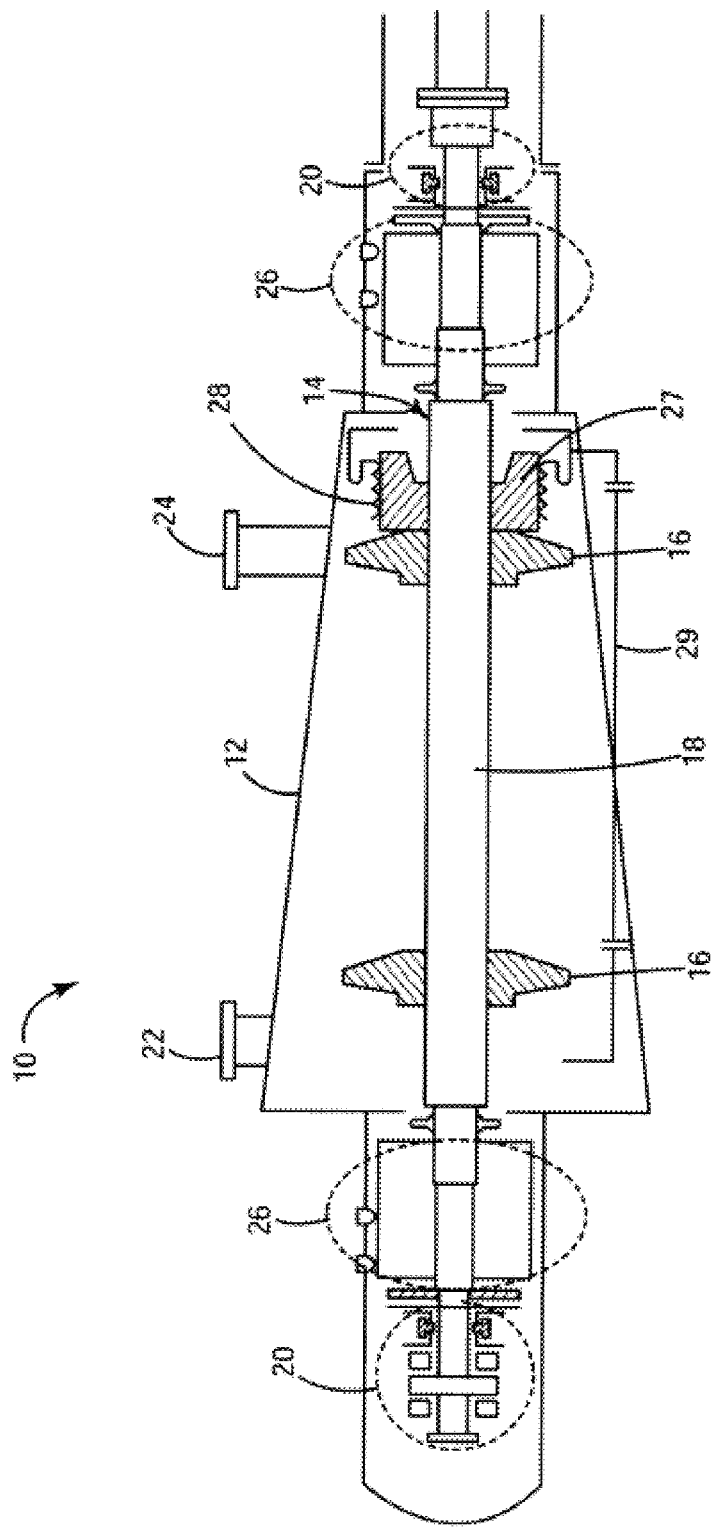
FIG. 2 is a schematic view of a multistage-type centrifugal compressor, provided with sealing mechanisms according to exemplary embodiments.

To provide some context for the subsequent discussion relating to sealing systems according to these exemplary embodiments, FIG. 2 schematically illustrates a multistage, centrifugal compressor 10 in which such sealing systems may be employed. Therein, the compressor 10 includes a box or housing (stator) 12 within which is mounted a rotating compressor shaft 14 that is provided with a plurality of centrifugal impellers 16. The rotor assembly 18 includes the shaft 14 and impellers 16 and is supported radially and axially through bearings 20 which are disposed on either side of the rotor assembly 18.

The multistage centrifugal compressor operates to take an input process gas from duct inlet 22, to accelerate the particles of the process gas through operation of the rotor assembly 18, and to subsequently deliver the process gas through outlet duct 24 at an output pressure which is higher than its input pressure. The process gas may, for example, be any one of carbon dioxide, hydrogen sulfide, butane, methane, ethane, propane, liquefied natural gas, or a combination thereof. Between the impellers 16 and the bearings 20, sealing systems 26 are provided to prevent the process gas from flowing to the bearings 20. The housing 12 is configured so as to cover both the bearings 20 and the sealing systems 26 to prevent the escape of gas from the centrifugal compressor 10. Also seen in FIG. 2 is a balance drum 27 which compensates for axial thrust generated by the impellers 16, the balance drum's labyrinth seal 28 and a balance line 29 which maintains the pressure on the outboard side of the balance drum 27 at the same level as the pressure at which the process gas enters via duct 22.

Figure 3:
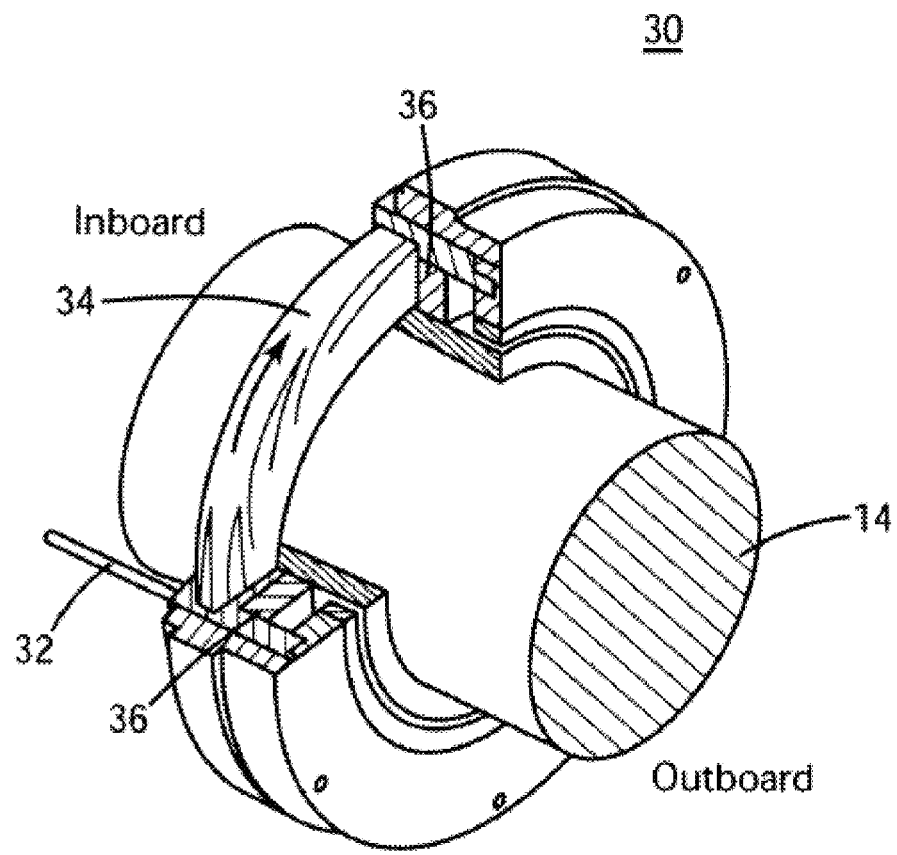
FIG. 3 is a partial sectional view of an exemplary dry gas seal used in sealing mechanisms according to exemplary embodiments.

According to exemplary embodiments, each of the sealing systems 26 includes one, two, three or more dry gas seals which together cooperate to seal the process gas from escaping toward the bearings 20. Generally speaking, the dry gas seal or seals in the sealing system 26 can be implemented as, for example, shown in FIG. 3. Therein, a dry gas seal 30 is seated on the compressor shaft 14 to block the flow of the process gas along the gas path 32 from the inboard side to the outboard side of the centrifugal compressor 10. The dry gas seal 30 includes a rotating seat 34 which rotates with the compressor shaft and mates with a stationary ring 36. During operation, grooves formed in at least one of the rotating seat 34 and the stationary ring 36 have a pressurized fluid pumped therein which has the effect of generating a fluid dynamic force which causes the stationary ring 36 to separate from the rotating seat 34. This creates a gap between the two rings, the combination of which operates as a seal that generally prevents leakage of the process gas, without friction between the rotating seat 34 and the stationary ring 36. Examples of these types of dry gas seals can be found in U.S. Pat. Nos. 5,492,341 and 5,529,315, the disclosures of which are incorporated here by reference.

When the compressor is stopped (not rotating), the primary ring is held against the mating ring with a series of springs. Because the grooves are not machined across the entire face of the mating ring, the two rings are in tight contact over the dam area and the running gap (and therefore seal leakage) is eliminated.

The existence of a running gap between the two rings results in gas leakage, which must be minimized. Ideally, a dry gas seal operates at a minimum running gap to minimize the leakage rate. However, a centrifugal compressor rotor is subject to axial movement during operation, which is restricted by a thrust bearing. During operation, the running gap between the two rings is self-regulating typically from 0 to 10 µm. If the running gap between the primary and mating seal rings increases during operation because of axial rotor movement, the pressure at the mating ring groove tips will be reduced as the volume increases. The gas forces acting on each side of the primary and mating seal rings will force the rings toward each other, thereby restoring the running gap to the desired value. Conversely, if the clearance between the seal rings decreases because of axial rotor movement, the pressure at the mating ring groove tips will increase as the volume decreases, overcoming the gas forces acting on the outside of the two rings, hence increasing the running gap to the desired value.

Dry gas seal failures are mainly due to liquid or solid particles contamination, "hang up" of primary disc causing discs contact, or axial vibration of primary disk ("swashing"). All of them causing catastrophic damages of seal surface.

Figure 4:
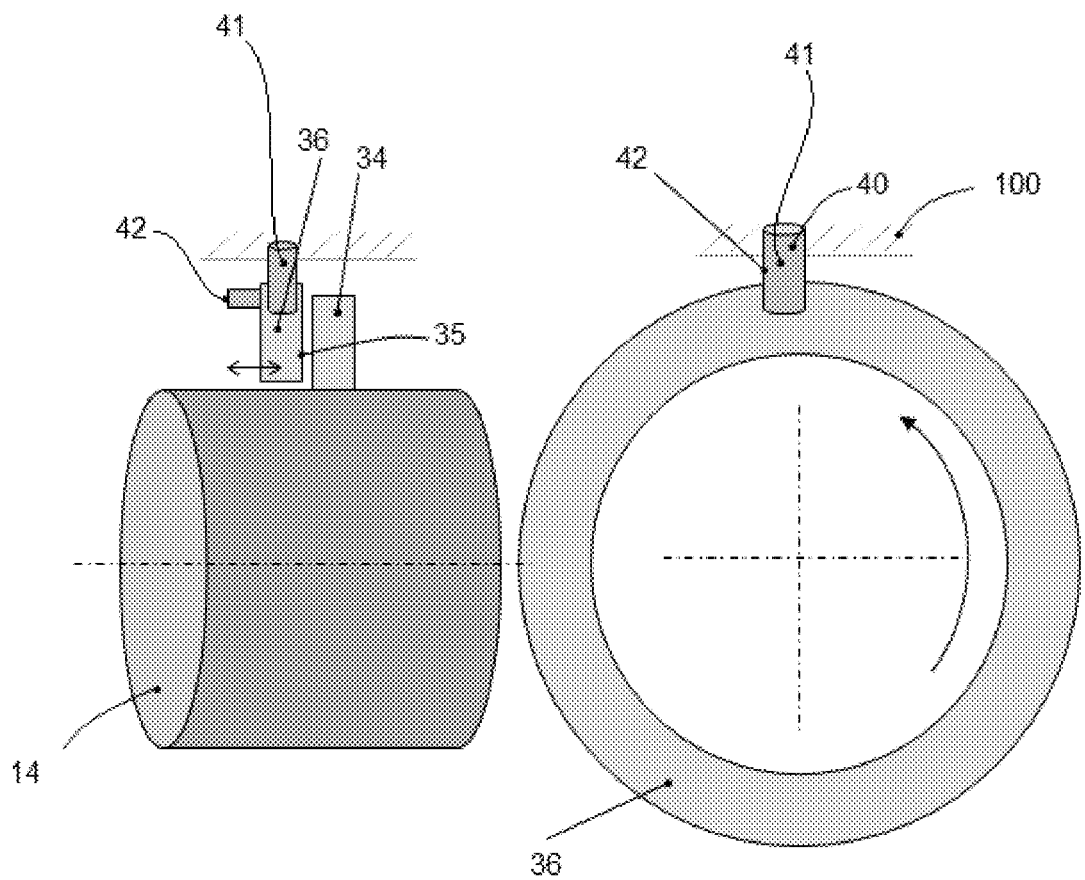
FIG. 4 schematically shows the mating ring and the primary ring of the seal of FIG. 3 with outlined the sensors on the anti-rotation pin/lug coupling the primary ring to the static part of a turbomachinery according to embodiments herein.

FIG. 4 schematically shows the mating ring 34 and the primary ring 36 in operation with the running gap indicated with reference number 35. The primary ring 36 is coupled to a static part of the turbomachine, particularly a retainer 100, through an anti-rotation system comprising one or more pin/lug 40.

By integrating a load sensor 41 in one or more of the pin/lug 40 of the anti-rotational system, the torque transmitted to the primary ring 36 by the rotating gas force can be detected.

By integrating one or more load sensors on one or more springs or spring support, the axial vibration and/or the axial movement of the carrier and/or the primary ring can be effectively detected.

Figure 5:
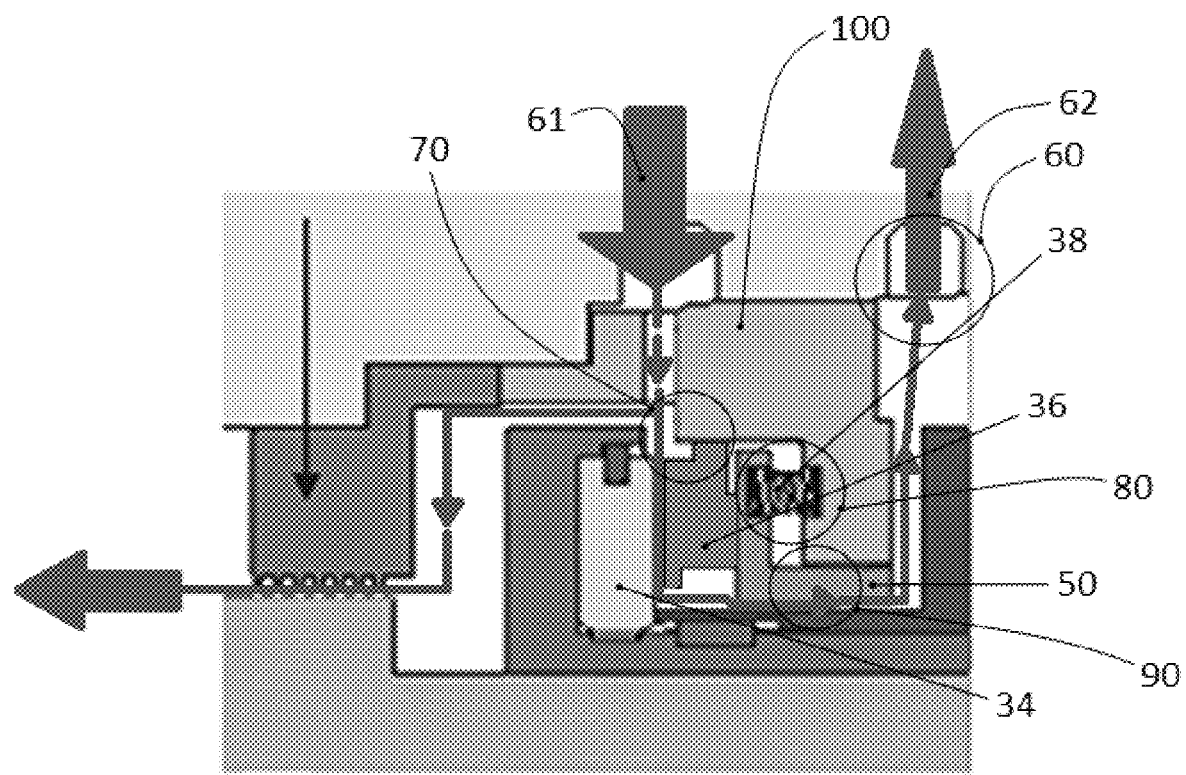
FIG. 5 schematically shows a section of a gas seal arrangement with circles indicating areas suitable for positioning one or more sensors for early detection of failures according to embodiments herein.
Figure 6:
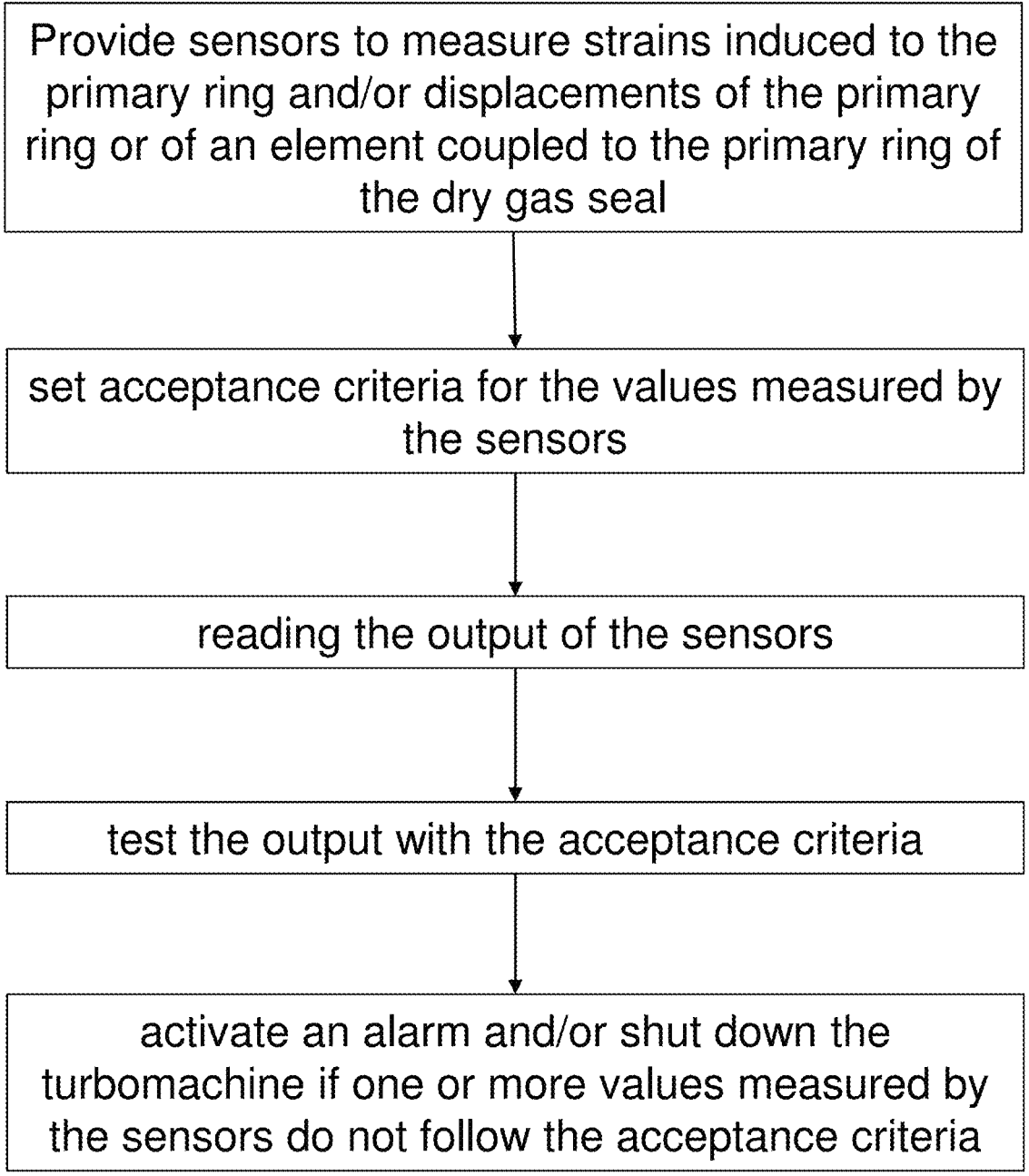
FIG. 6 is a flowchart illustrating a method for monitoring a dry gas seal according to exemplary embodiments herein.

More complex configurations are possible. FIG. 5 schematically shows a section of a gas seal arrangement according to embodiments herein. The circles indicate areas suitable for positioning one or more sensors for early detection of failures of the seal as follows:
1) Primary ring axial vibration measurement (swashing): ref. 70 and/or 80
2) Torque measurement (anti-rotation pin/lug): ref. 70
3) Carrier/retainer movement control (hung-up): ref. 90
4) Flow measurement on the dry gas seal vent: ref. 60.

The primary ring 36 is capable of axial movement to float with the mating ring 34. To such extent one or more elastic elements 38 apply a uniformly distributed preload to push the primary ring 36 against the mating ring 34 through an intermediate element 50 acting as a pusher sleeve, also called carrier in the present description.

A displacement sensor can be used to measure axial movement of the carrier 50 and/or the retainer 100 to detect a fault situation due to carrier/retainer hang-up. Such a sensor can be typically positioned in the axial part of the carrier/retainer closed to the rotor where hang-up is more likely as shown by reference 90 in FIG. 5. This type of sensor can be also used for indirectly measuring primary ring swashing. Sensor 80 may be a load sensor for the measurement of vibrations or axial movement of the carrier and/or the primary ring. In an embodiment such sensor is integrated in one or more springs forming the elastic elements.

Other sensors can be used to further improve monitoring of the status of the seal. As dry gas seals comprise a flowpath for a sealing gas to flow from an inlet 61 to an outlet 62 to cause the lift-off of the mating ring and the primary ring, a flow sensor can be provided in such flowpath to measure the flow of the sealing gas, for example in the outlet zone as indicated by reference 60 in FIG. 5. Such flow sensor can be of any known type, such as hot wire or thermal mass type, to detect velocity, flow, pressure, differential pressure or the like parameters.

The output of all these sensors, or part of them, can be used to monitor the status of the seal. For example, an increase in the torque transmitted to the primary ring and/or axial displacements having a frequency of vibration above a threshold may be an index of liquid or solid particles contamination. Carrier/retainer lack of displacement or carrier/retainer displacements not following an expected path may be index of carrier/retainer blockage that may cause primary ring hang-up while an excessive flow of the sealing gas as detected by sensor 60 may be index of a leakage in the flowpath.

To such extent, embodiments provide for a control unit comprising memory storing program instructions and a processor configured to execute the program instructions to:
 read the output of the sensor or the sensors;
 compare the output with thresholds to determine a fault condition of the seal;
 provide an alarm indication and/or shut down the turbomachine if the output of the sensors are indicative of a severe fault condition of the seal.

The control unit may be part of a dedicated safety system or be part of the same system controlling the functioning of the turbomachine.

Measured values can be acquired by M&D systems; analytics can be applied in order to do early detection of failures, notify customer of potential damages, perform condition based maintenance.

Figure 7:
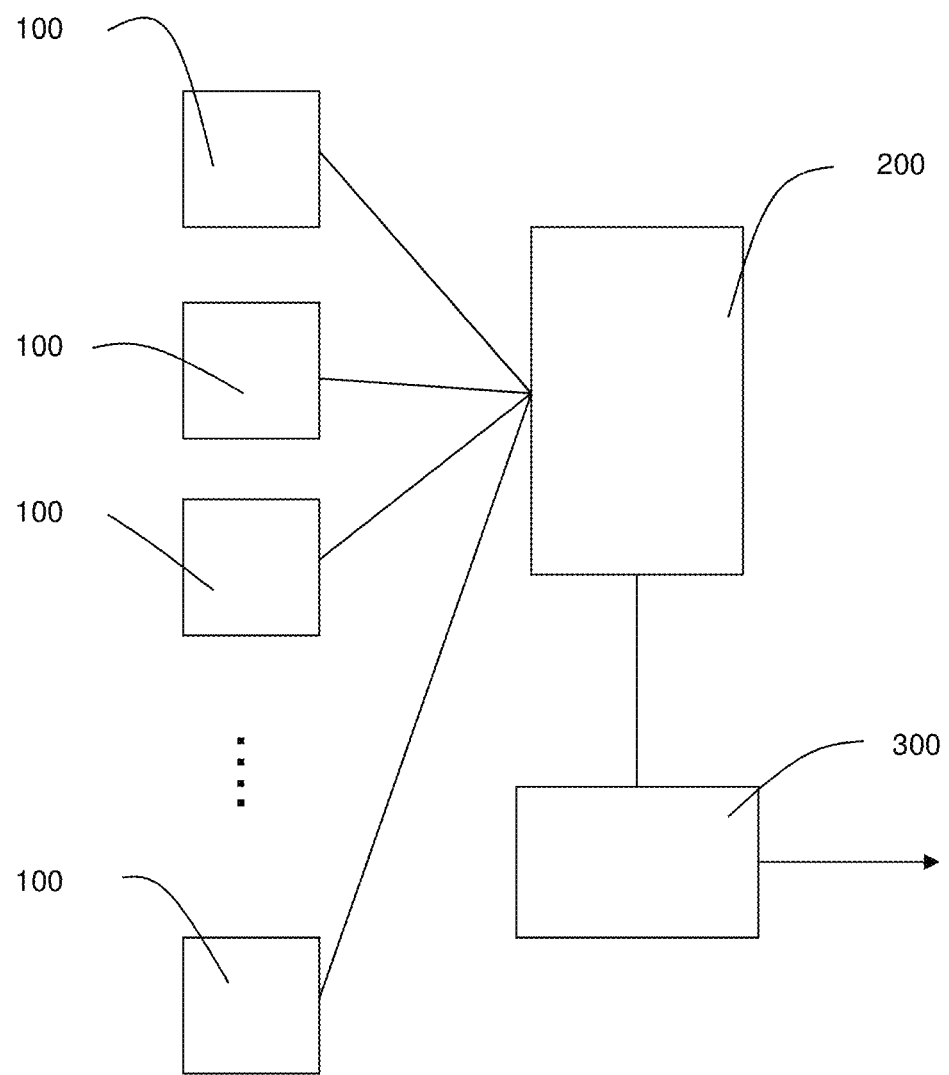
FIG. 7 shows the block diagram of a system for the monitoring and early detection of fault of dry gas seals of remotely located turbomachines according to exemplary embodiments herein.

FIG. 7 exemplary shows a system for the monitoring and early detection of fault of dry gas seals of remotely located turbomachines according to embodiments herein. The system comprises:
 a collecting unit (200) for collecting data from sensors located on the dry seals of the turbomachines;
 communication units (100) to interface the turbomachines to the collecting unit;
 a software platform (300) configured to read data from the collecting unit (200) to perform analytics to do early detection and/or send notifications of potential damages or to perform condition based maintenance of the turbomachines.

Embodiments also provide for a method for monitoring the status of a dry gas seal in a turbomachine, the method comprising the operations of:
 providing sensors to measure strains induced to the primary ring and/or displacements of the primary ring or of an element coupled to the primary ring of the dry gas seal;

setting acceptance criteria for the values measured by the sensors;
reading the output of the sensors;
test the output with the acceptance criteria;
activate an alarm and/or shut down the turbomachine if one or more values measured by the sensors do not follow the acceptance criteria.

The method may further comprise:
sending the output of the sensors to a remote software platform capable to collect data from seals of different turbomachine to perform analytics to do early detection and/or
sending notifications of potential damages or to perform condition based maintenance.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dry gas seal for sealing a shaft of a turbomachine, the seal comprising:
   a mating ring configured to be coupled to the shaft of the turbomachine to rotate at shaft rotational speed;
   a primary ring that seals against the mating ring, the primary ring configured to be anti-rotationally coupled to a static part of the turbomachine;
   at least one elastic element abutting against the primary ring and preloaded to push the primary ring against the mating ring; and
   at least one sensor coupled to the primary ring to measure strains or loads induced to the primary ring and to the at least one elastic element, or displacements of the primary ring.

2. The seal according to claim 1, wherein the primary ring is configured to be anti-rotationally coupled with a retainer through an anti-rotational system comprising one or more anti-rotational pin or lug, the at least one sensor comprising a load sensor coupled to the one or more anti-rotational pin or lug to detect torques induced to the primary ring.

3. The seal according to claim 1, wherein sensors comprise an axial vibration sensor to detect axial movements of the primary ring and/or the retainer towards/from the mating ring.

4. The seal according to claim 1, wherein the elastic element or elements are coupled to the primary ring through an intermediate element capable of axial movement to move with the primary ring upon mating ring axial movement, the sensors comprising a displacement sensor to detect axial movement of the intermediate element.

5. The seal according to claim 4, wherein the sensors comprise axial vibration sensors or load sensors coupled to, or integrated in, one or more of the elastic elements.

6. The seal according to claim 1, wherein the seal comprises a flowpath for a sealing gas to flow from an inlet to an outlet to cause a gap to form between the mating ring and the primary ring, a flow sensor being provided in such flowpath to measure the flow of the sealing gas.

7. A turbomachine comprising:
   a rotor assembly including at least an impeller;
   a bearing connected to, and for rotatably supporting, the rotor assembly;
   a stator; and
   a sealing mechanism disposed between the rotor assembly and the bearing, said sealing mechanism including a dry gas seal according to claim 1 with the mating ring and the primary ring of the seal respectively coupled to the rotor assembly and the stator.

8. The turbomachine according to claim 7, wherein the primary ring of the seal is coupled to a retainer through an anti-rotational system comprising one or more anti-rotational pin or lug and an intermediate element or carrier acting as a pusher sleeve to axially push the primary ring against the mating ring under the action of the at least one elastic element, the sensor or sensors of the seal comprising one or more sensors belonging to the group consisting in: displacement sensor for the measurement of the axial displacement of the primary ring, displacement sensor for the measurement of the axial displacement of the intermediate ring, strain sensor for the measurement of the torque induced to the primary ring, load sensors for the measurement of static load acting on the carrier and/or the primary ring, load sensors for the measurement of vibrations of the carrier and/or the primary ring.

9. The turbomachine according to claim 7, further comprising a control unit configured to:
   read the output of the sensor or the sensors;
   compare the output with thresholds to determine a fault condition of the seal; and
   provide an alarm indication.

10. The turbomachine according to claim 9, wherein the control unit is further configured to shut down the turbomachine if the output of the sensors are indicative of a fault condition of the seal.

11. A method for monitoring the status of a dry gas seal in a turbomachine, the method comprising:
    providing at least one sensors arranged with the dry gas seal, wherein the dry gas seal comprises:
        a mating ring configured to be coupled to a shaft of the turbomachine to rotate at shaft rational speed;
        a primary ring that seals against the mating ring, the primary ring configured to be anti-rationally coupled to a static part of the turbomachine; and
        at least one elastic element abutting against the primary ring and preloaded to push the primary ring against the mating ring;
        wherein the at least one sensor is coupled to the primary ring;
    measuring a value of at least one strain or load or displacement of the primary ring via the at least one sensor;
    setting a threshold limit for the measured value measured by the at least one sensor;
    comparing the measured value with the threshold limit; and
    activating an alarm upon the measured value exceeding the threshold limit.

12. The method according to claim 11, further comprising:
    sending the output of the sensors to a remote software platform capable to collect data from seals of different turbomachine to perform analytics to do early detection.

13. The method according to claim 12, further comprising sending notifications of potential damages or to perform condition based maintenance.

14. A system for the monitoring and early detection of fault of dry gas seals of remotely located turbomachines, the system comprising:
  a plurality of dry gas seals, each seal comprising:
    a mating ring configured to be coupled to the shaft of the turbomachine to rotate at shaft rotational speed;
    a primary ring that seals against the mating ring, the primary ring configured to be anti-rotationally coupled to a static part of the turbomachine;
    at least one elastic element abutting against the primary ring and preloaded to push the primary ring against the mating ring; and
    at least one sensor coupled to the primary ring to measure strains or loads induced to the primary ring and to the at least one elastic element, or displacements of the primary ring; and
  a plurality of communication units configured to interface with the each of the plurality of the dry gas seals of the turbomachines transmit a measured value of at least one strain or load or displacement of the primary ring measured via the at least one sensor.

* * * * *